US012346055B2

(12) United States Patent
Kubo

(10) Patent No.: US 12,346,055 B2
(45) Date of Patent: Jul. 1, 2025

(54) IMAGE FORMING APPARATUS

(71) Applicant: KYOCERA Document Solutions Inc., Osaka (JP)

(72) Inventor: Tomoaki Kubo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/673,775

(22) Filed: May 24, 2024

(65) Prior Publication Data

US 2024/0393736 A1 Nov. 28, 2024

(30) Foreign Application Priority Data

May 26, 2023 (JP) ................................ 2023-086779

(51) Int. Cl.

*G03G 15/04* (2006.01)
*G03G 15/00* (2006.01)
*G03G 15/08* (2006.01)
*G03G 21/16* (2006.01)

(52) U.S. Cl.

CPC ..... *G03G 21/1652* (2013.01); *G03G 15/0806* (2013.01); *G03G 15/80* (2013.01); *G03G 21/1619* (2013.01)

(58) Field of Classification Search

CPC .......................... G03G 15/0806; G03G 15/80
USPC ................................ 399/107, 110, 111, 119
See application file for complete search history.

(56) References Cited

U.S. PATENT DOCUMENTS

2020/0393789 A1 12/2020 Ohashi

FOREIGN PATENT DOCUMENTS

JP 2017009874 * 1/2017
JP 2020201459 A 12/2020

* cited by examiner

*Primary Examiner* — Hoan H Tran
(74) *Attorney, Agent, or Firm* — Alleman Hall & Tuttle LLP

(57) ABSTRACT

An image forming apparatus includes: a developing device removably supported by a support frame; a separation mechanism that moves the developing device so that a developing roller separates from a photoconductor drum before the developing device is removed from the support frame; a toner density detection sensor provided in a developing housing; and a relay board supported by the support frame and electrically connectable to the sensor. In a state in which the developing device is not being moved by the separation mechanism, the sensor is electrically connected to the relay board, and when the developing device is moved by the separation mechanism before the developing device is removed from the support frame, the sensor is separated from the relay board.

6 Claims, 11 Drawing Sheets

IMAGE FORMING APPARATUS

INCORPORATION BY REFERENCE

This application is based upon and claims the benefit of priority from the corresponding Japanese Patent Application No. 2023-086779 filed on May 26, 2023, the entire contents of which are incorporated herein by reference.

BACKGROUND

The present disclosure relates to an image forming apparatus including a removable developing device.

An electrophotographic image forming apparatus includes a developing device that develops a latent image formed on a photoconductor drum using a developing agent carried by a developing roller. The developing device is removably supported by a support frame for maintenance or replacement.

When the developing device is removed while the developing roller is close to the photoconductor drum, there is a risk that the photoconductor drum and the developing device will interfere and the photoconductor drum will be damaged.

The image forming apparatus may include a developing holder that supports the developing device and pivots in a direction in which the developing roller approaches the photoconductor drum and in a direction in which the developing roller moves away from the photoconductor drum.

By causing the developing holder to pivot in a direction in which the developing roller moves away from the photoconductor drum and then removing the developing device, the developing device can be removed without damaging the photoconductor drum.

Generally, a developing device includes a density sensor that detects density of toner. The density sensor is attached to a lower surface of a developing housing of the developing device.

Furthermore, a relay board is also attached to the lower surface of the developing housing, and is a relay for the density sensor and a control portion of the main body of the device. For this reason, in a case where, for example, the developing device is supported by the developing holder, it is necessary to provide a space for accommodating the relay board in the developing holder.

In addition, when the developing device is removed or installed, it is necessary to arrange the density sensor and the relay board so as not to interfere with the developing holder, and the like, which increases design constraints and increases the size of the device.

Furthermore, it is necessary to process a signal line between the density sensor and the relay board on the developing device side, and thus there is a problem in that automatic production cannot be supported.

SUMMARY

In order to solve the problems described above, an image forming apparatus according to the present disclosure includes: a photoconductor drum supported by a support frame, an electrostatic latent image being formed on the photoconductor drum; a developing device that is removably supported by the support frame and includes a developing roller configured to develop the electrostatic latent image formed on the photoconductor drum with a developing agent; and a developing housing configured to accommodate the developing agent; a separation mechanism configured to move the developing device so that the developing roller is separated from the photoconductor drum before the developing device is removed from the support frame; a sensor provided in the developing housing and configured to detect toner density within the developing housing; and a relay board supported by the support frame and configured to be electrically connectable to the sensor; wherein in a state in which the developing device is not being moved by the separation mechanism, the sensor is electrically connected to the relay board, and when the developing device is moved by the separation mechanism before the developing device is removed from the support frame, the sensor is separated from the relay board.

In the image forming apparatus according to the present disclosure, in a state in which the developing device is not being moved by the separation mechanism; the relay board may be supported so as to be movable in an up-down direction between an upper position where the relay board is electrically connected to the sensor and a lower position where the electrical connection with the sensor is cut off; and when the developing device is moved by the separation mechanism so that the developing roller is separated from the photoconductor drum, the developing device may move from the upper position to the lower position.

In the image forming apparatus according to the present disclosure, the separation mechanism may include: a developing holder by which the developing device is supported; an upper rail provided on a lower surface of the developing holder so as to extend in an axial direction of the developing roller, and having an upper protruding portion protruding downward; and a lower rail supported below the upper rail so as to be movable in the axial direction and having a lower protruding portion protruding upward; wherein when the lower rail moves to a first position where the lower protruding portion is separated from the upper protruding portion, the developing holder may pivot so that the developing roller separates from the photoconductor drum; when the lower rail moves to a second position where the lower protruding portion overlaps the upper protruding portion in the axial direction, the developing holder may pivot so that the upper protruding portion rides up on the lower protruding portion and the developing roller comes in contact with the photoconductor drum; and the relay board may move from the upper position to the lower position as the lower rail moves from the second position to the first position.

The image forming apparatus according to the present disclosure may further include a board holder that is movably supported in an up-down direction by the upper rail and supports the relay board; wherein the lower rail may have a pedestal portion on which the board holder is placed; in a state in which the lower rail is moving to the second position, the board holder may be placed on the pedestal portion and move to the upper position; and when the lower rail moves to the first position, the board holder may move away from the pedestal portion and move to the lower position.

In the image forming apparatus according to the present disclosure, the board holder may have a boss that protrudes in a direction intersecting a direction of movement of the lower rail from the second position to the first position; the lower rail may have a guide groove into which the boss is inserted; and as the lower rail moves from the second position to the first position, the guide groove may guide the board holder over the pedestal portion in a direction parallel to the direction of movement, and then downward toward an upstream side of the direction of movement.

In the image forming apparatus according to the present disclosure, the pedestal portion may have an inclined surface that is inclined upward from the upstream side to a downstream side in the direction of movement; and when the lower rail moves from the first position to the second position, the board holder may move from the lower position to the upper position along the inclined surface.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An image forming apparatus of an embodiment according to the present disclosure will be described below with reference to the drawings.

Figure 1:
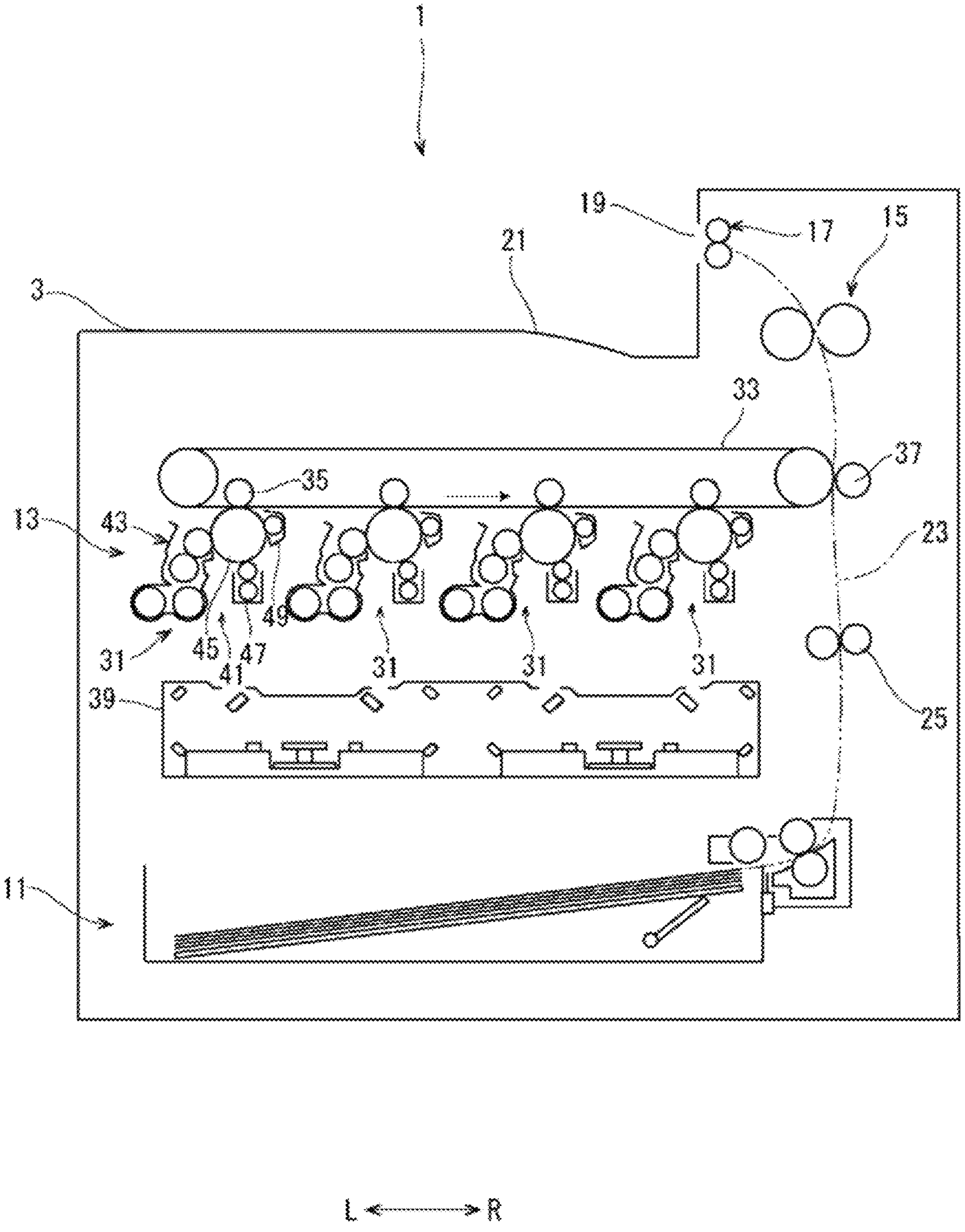
FIG. 1 is a front view schematically showing an internal configuration of an image forming apparatus of an embodiment according to the present disclosure.
Figure 2A:
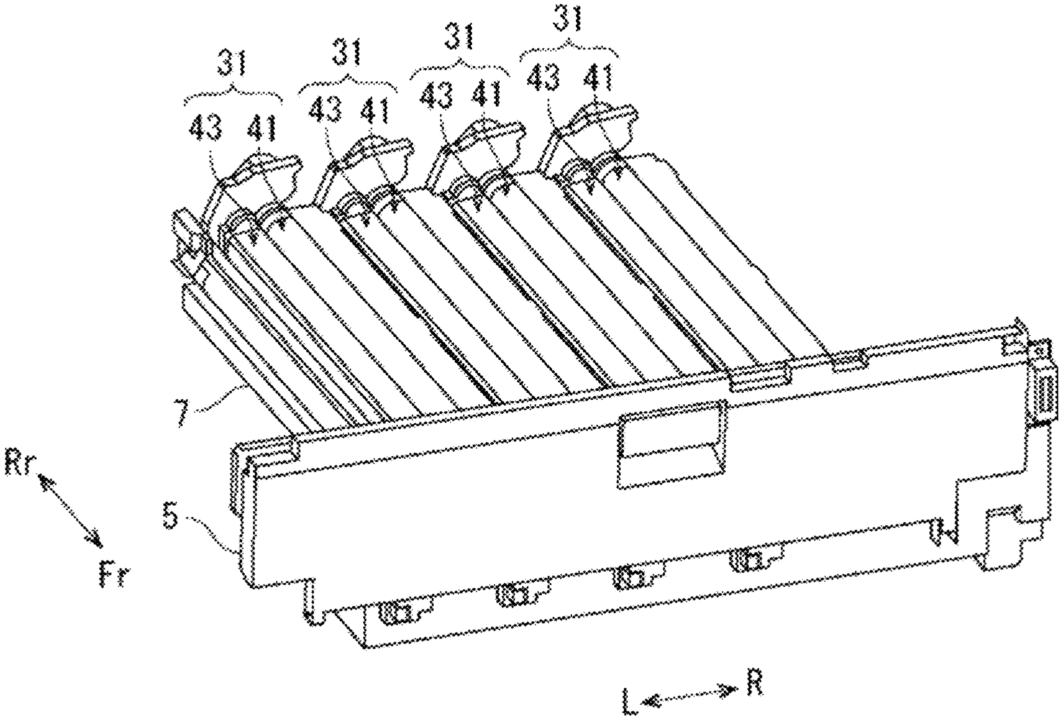
FIG. 2A is a perspective view showing a developing device and a drum unit supported by a support frame and an inner cover rotated upward in an image forming apparatus of an embodiment according to the present disclosure.
Figure 2B:
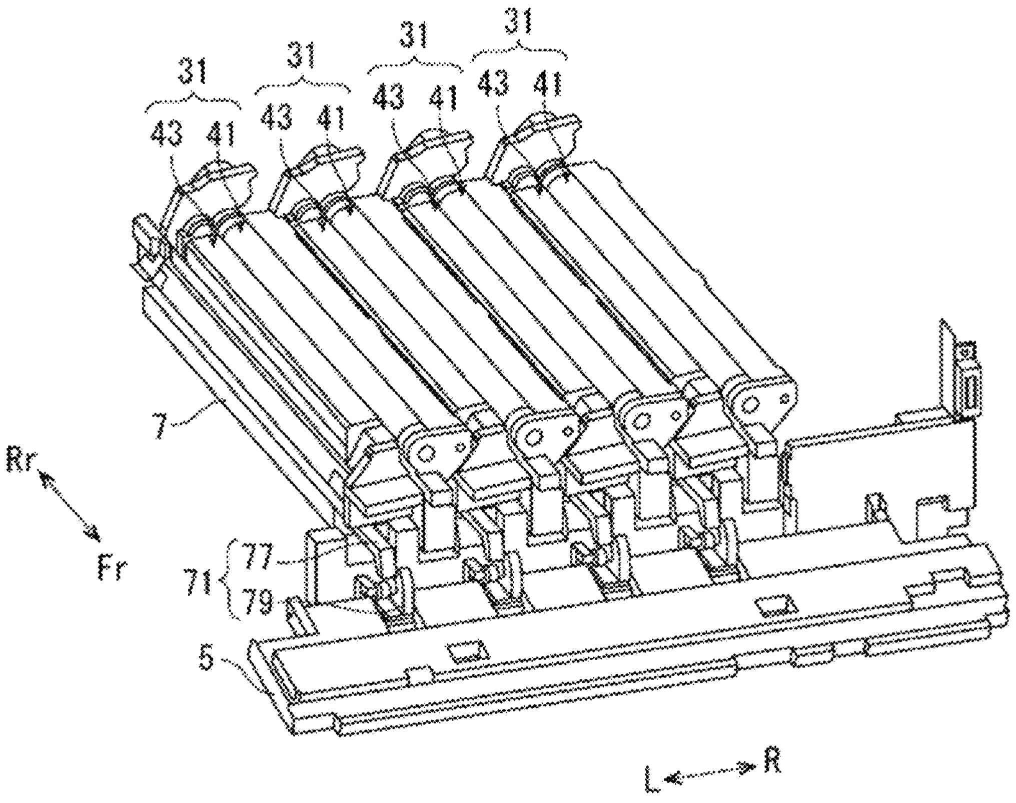
FIG. 2B is a perspective view showing a developing device and a drum unit supported by a support frame and an inner cover rotated downward in an image forming apparatus of an embodiment according to the present disclosure.

An overall configuration of an image forming apparatus 1 will be described with reference to FIGS. 1, 2A, and 2B. FIG. 1 is a front view schematically showing an internal configuration of the image forming apparatus 1, and FIGS. 2A and 2B are perspective views showing a support frame 7 and an inner cover 5. In the drawings, Fr, Rr, L, and R indicate the front side, rear side, left side, and right side of the image forming apparatus 1, respectively.

As shown in FIG. 1, the image forming apparatus 1 includes a housing 3 having a substantially rectangular parallelepiped hollow portion. An opening (not shown) is formed in an upper portion of a front surface of the housing 3. The opening is opened and closed by an outer cover (not shown) that is rotatably supported around a lower end portion.

Furthermore, the inner cover 5 (not shown in FIG. 1, see FIGS. 2A and 2B) is provided inside the outer cover and is rotatably supported around the lower end portion. A rectangular plate-shaped support frame 7 is provided inside the inner cover 5.

Referring to FIG. 1, the hollow portion of the housing 3 houses a sheet feed portion 11 that feeds sheets, an image forming portion 13 that forms a toner image to be transferred to a sheet, a fixing portion 15 that fixes the toner image to the sheet, and a discharge portion 17 that discharges the sheet with the toner image fixed thereon.

The sheet feed portion 11 is provided in a lower portion of the hollow portion of the housing 3. The image forming portion 13 is provided above sheet feed portion 11. The fixing portion 15 is provided above the image forming portion 13, and the discharge portion 17 is provided above the fixing portion 15. In addition, on an upper surface of the housing 3, there are provided a discharge port 19 through which sheets are discharged, and a discharge tray 21 on which the sheets discharged from the discharge port 19 are stacked.

Furthermore, a sheet conveying path 23 is formed in the hollow portion of the housing 3, which extends from the sheet feed portion 11 through the image forming portion 13 and fixing portion 15 to the discharge portion 17. The conveying path 23 is provided with a registration roller pairs 25 upstream of the image forming portion 13 in the sheet conveying direction.

Next, the image forming portion 13 will be explained with reference to FIG. 1. The image forming portion 13 includes four image forming units 31 corresponding to toner of four colors (yellow, cyan, magenta, black), an intermediate transfer belt 33, four primary transfer rollers 35 corresponding to the four image forming units 31, a secondary transfer roller 37, and an exposure device 39.

Each of the four image forming units 31 includes a drum unit 41 and a developing device 43. The drum unit 41 includes a rotatable photoconductor drum 45, a charging device 47, and a cleaning device 49.

As shown in FIGS. 2A and 2B, the image forming unit 31 (drum unit 41 and developing device 43) is supported by the support frame 7. The support frame 7 is partitioned into four sections arranged side by side in a left-right direction for each image forming unit 31.

In each section, a developing device support portion that supports the developing device 43, and a drum unit support portion that supports the drum unit 41 are provided side by side in the left-right direction. When the outer cover and the inner cover 5 are opened, the image forming units 31 supported by the support frame 7 are exposed through an opening at a front surface of the housing 3. The drum unit 41 and the developing device 43 are removable from the drum unit support portion and the developing device support portion, respectively, along a direction from the rear to the front and through the opening.

Referring again to FIG. 1, the intermediate transfer belt 33 is arranged above the four image forming units 31 and wound between a drive roller and a driven roller that are spaced apart from each other in the left-right direction, and travels in a direction shown by the arrow in FIG. 1. An outer surface of a track at a lower side of the intermediate transfer belt 33 faces the photoconductor drums 45 of the four image forming units 31, forming a primary transfer nip between the photoconductor drums 45 and the intermediate transfer belt 33.

The four primary transfer rollers 35 are arranged in the hollow portion of the intermediate transfer belt 33 and face the primary transfer nip. The secondary transfer roller 37 faces the drive roller with the intermediate transfer belt 33 in between, and forms a secondary transfer nip between the secondary transfer roller 37 and the intermediate transfer belt 33. The conveying path 23 passes through this secondary transfer nip. The exposure device 39 is arranged below the support frame 7 (see FIGS. 2A and 2B) and can expose the photoconductor drum 45 through an opening (not shown) provided in the support frame 7.

The image forming operation will be briefly explained. In each image forming unit 31 of the image forming portion 13, a charging device 47 charges the photoconductor drum 45 to a predetermined potential. After that, the photoconductor drum 45 is exposed by the exposure device 39 based on image data to form an electrostatic latent image. The electrostatic latent image is developed into a toner image by the developing device 43.

The toner image is transferred from the photoconductor drum 45 to the intermediate transfer belt 33 in the primary transfer nip by the primary transfer roller 35 to which a transfer bias is applied. A full-color toner image is formed on the intermediate transfer belt 33 by each of the four image forming units 31 transferring a toner image onto the intermediate transfer belt 33.

On the other hand, a sheet is fed from the sheet feed portion 11 to the conveying path 23. The sheet is conveyed along the conveying path 23, and after a skew of the sheet is corrected by a registration roller pair 25, the sheet is conveyed to the secondary transfer nip.

In the secondary transfer nip, a full-color toner image is transferred from the intermediate transfer belt 33 to the sheet by the secondary transfer roller 37 to which a transfer bias is applied. After that, the sheet is conveyed to the fixing portion 15, and the toner image is heated and pressurized to be fixed to the sheet. The sheet is conveyed to the discharge portion 17 and discharged by the discharge portion 17 to the discharge tray 21 through the discharge port 19.

Figure 3A:
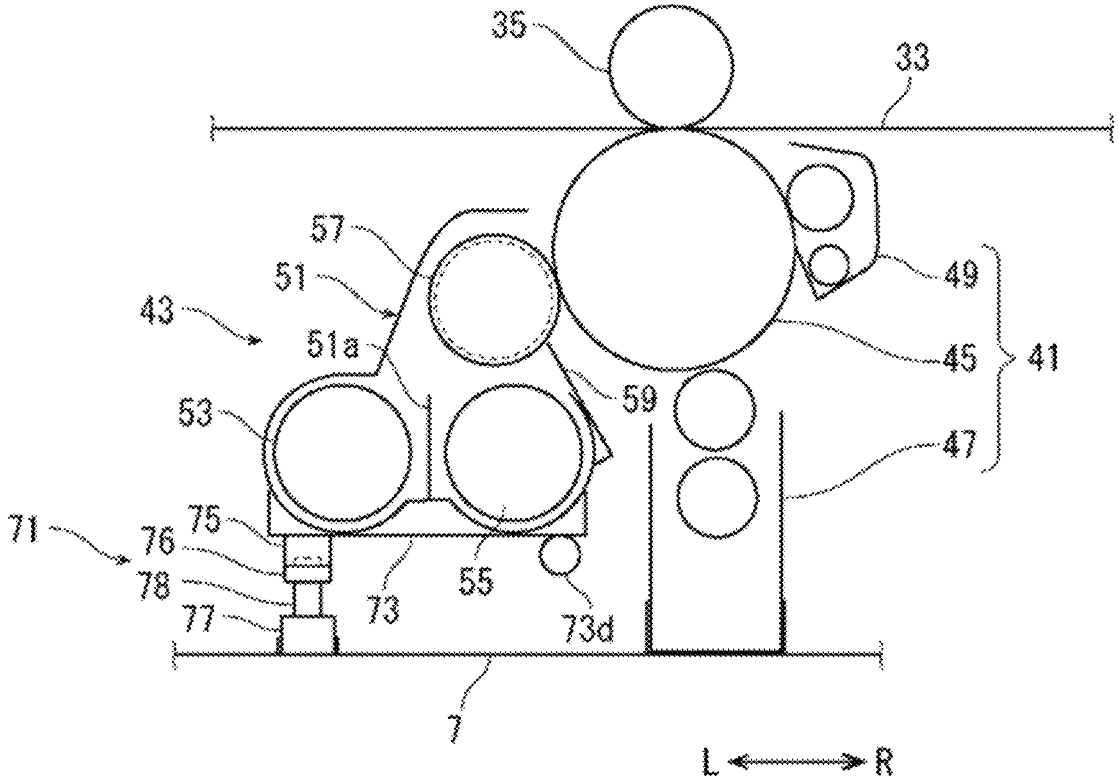
FIG. 3A is a front view showing a drum unit and a developing device pivoted to a developing position in an image forming apparatus of an embodiment according to the present disclosure.
Figure 3B:
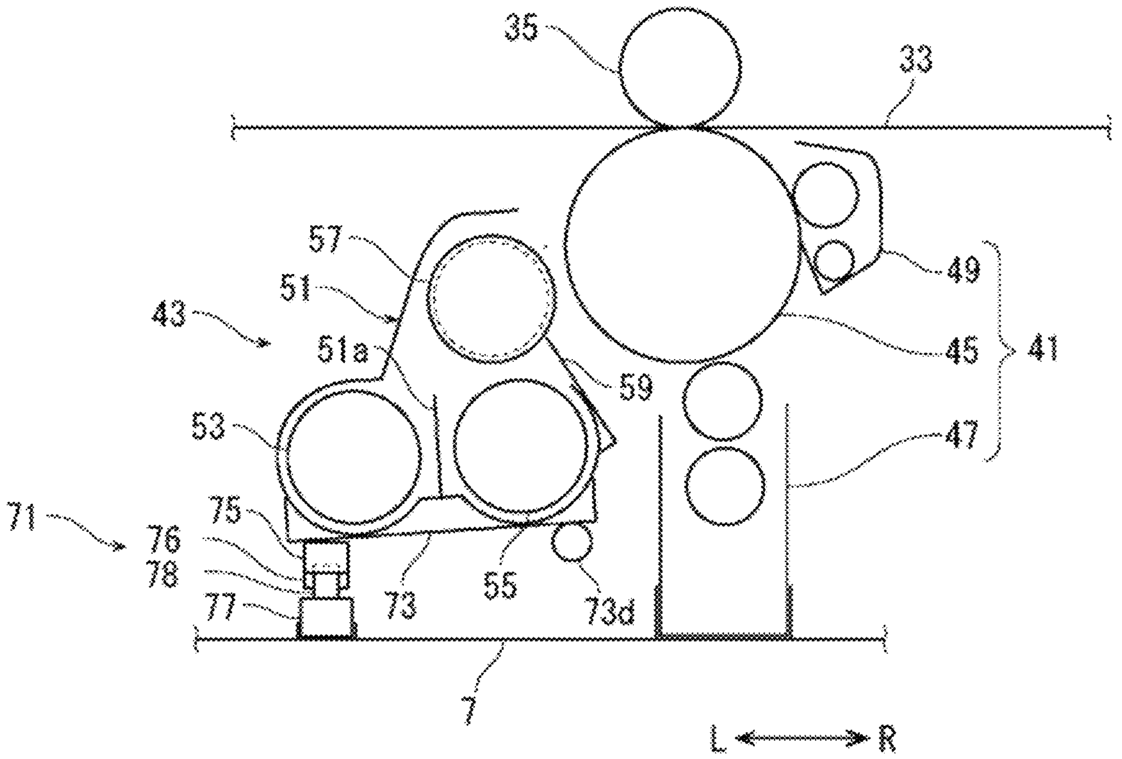
FIG. 3B is a front view showing a drum unit and a developing device pivoted to a separated position in an image forming apparatus of an embodiment according to the present disclosure.
Figure 4:
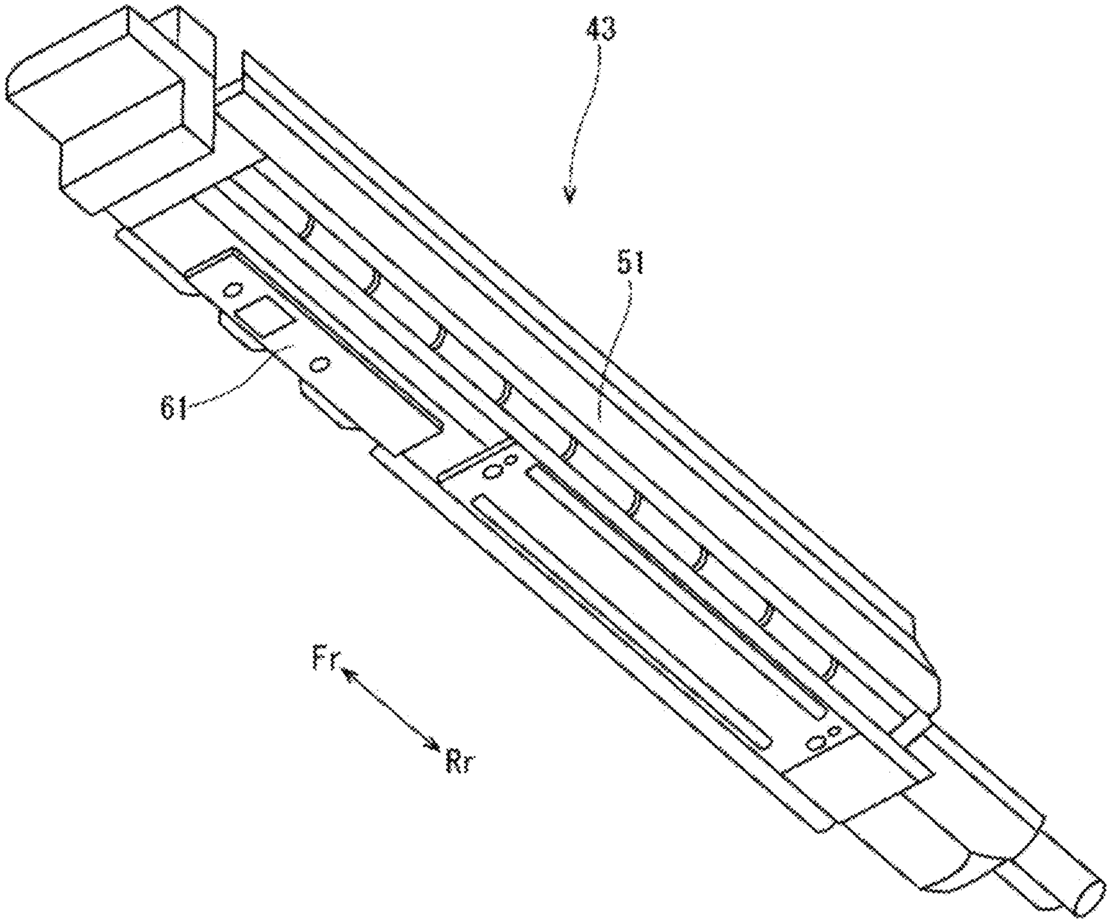
FIG. 4 is a perspective view of a developing device viewed from below in an image forming apparatus of an embodiment according to the present disclosure.

Next, the developing device 43 will be explained with reference to FIGS. 3A, 3B, and 4. FIGS. 3A and 3B are front views showing the developing device 43, and FIG. 4 is a perspective view of the developing device 43 as viewed from below.

As shown in FIGS. 3A and 3B, the developing device 43 includes a developing housing 51. The developing housing 51 supports a stirring roller 53, a supply roller 55, a developing roller 57, and a blade 59.

The developing housing 51 has an opening that faces the photoconductor drum 45 of the drum unit 41. A lower portion of an inner portion of the developing housing 51 is partitioned into two roller storage chambers by a partition wall 51*a* extending in the front-rear direction. In addition, a supply port (not shown) through which toner is supplied from a toner container (not shown) is provided at a rear portion of the developing housing 51.

The stirring roller 53 is housed in one of the roller storage chambers and is rotatably supported by the developing housing 51. The supply roller 55 is housed in the other roller storage chamber and rotatably supported by the developing housing 51.

The developing roller 57 is arranged above the supply roller 55 so that a portion thereof is exposed through the opening, and is rotatably supported by the developing housing 51. The blade 59 is arranged at a predetermined distance from the developing roller 57 and is fixed to the developing housing 51.

The toner supplied from the toner container (not shown) to the developing housing 51 through the supply port is stirred and charged while being conveyed by the stirring roller 53 and the supply roller 55. A developing agent including the charged toner is supplied from the supply roller 55 to the developing roller 57, and a magnetic brush is formed on the surface of the developing roller 57.

A layer thickness of the magnetic brush is regulated by the blade 59. The electrostatic latent image formed on the photoconductor drum 45 is developed by the toner included in the magnetic brush thus formed.

As shown in FIG. 4, a sensor 61 for detecting the density of toner in the developer housing 51 is attached to a lower surface of a front half portion of a bottom portion of the developing housing 51.

Generally, the developing agent is supplied from a toner container (not shown) through a supply port provided at a rear portion of the developing housing 51, and is stirred while being conveyed forward by the stirring roller 53. Therefore, the toner density is stabilized at a front portion of the developing housing 51.

The sensor 61 is arranged so as to detect the toner density of the developing agent within the front portion of developing housing 51. By electrically connecting the sensor 61 to a control portion (not shown) provided in the housing 3, it becomes possible to transmit a measured value to the control portion.

In addition, the developing device 43 is supported by a developing device support portion of the support frame 7 so as to be able to pivot in the counterclockwise direction in FIGS. 3A and 3B from a developing position where the developing roller 57 exposed through the opening of the developing housing 51 is close to the photoconductor drum 45 (see FIG. 3A), to a separated position where the developing roller 57 is separated from the photoconductor drum 45 (see FIG. 3B).

As described above, the developing device 43 is removably supported by the support frame 7 for maintenance or replacement. When the developing roller 57 and the photoconductor drum 45 are in contact with each other when the developing device 43 is removed and installed, there is a risk that the photoconductor drum 45 will be damaged by the developing roller 57 and the like.

Therefore, when the developing device 43 is removed and installed, the separation mechanism causes the developing device 43 to pivot from the developing position (see FIG. 3A) to the separated position (see FIG. 3B).

Figure 5:
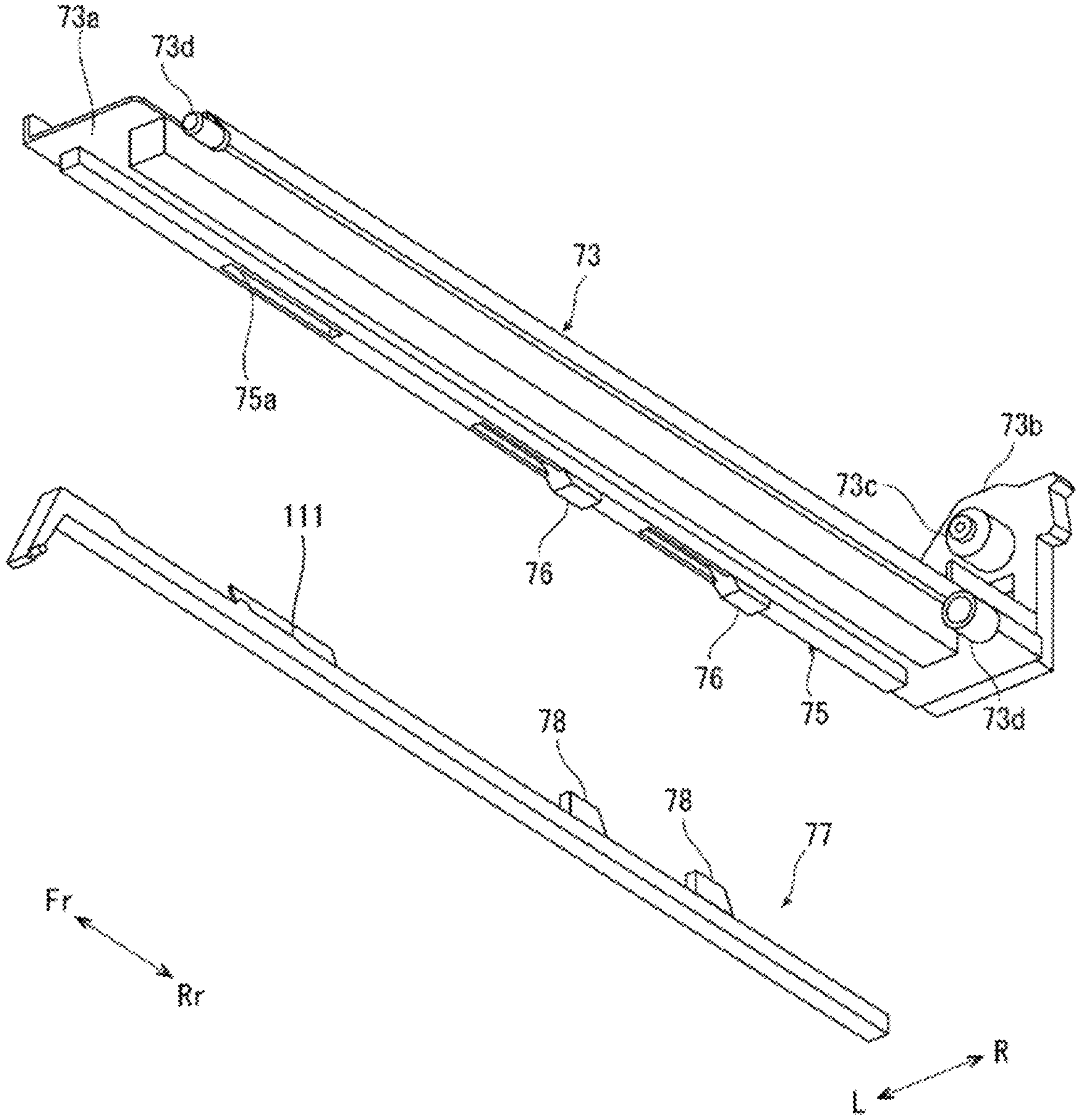
FIG. 5 is a perspective view of a developing holder, and an upper rail and a lower rail of a separation mechanism viewed from below in an image forming apparatus of an embodiment according to the present disclosure.
Figure 6A:
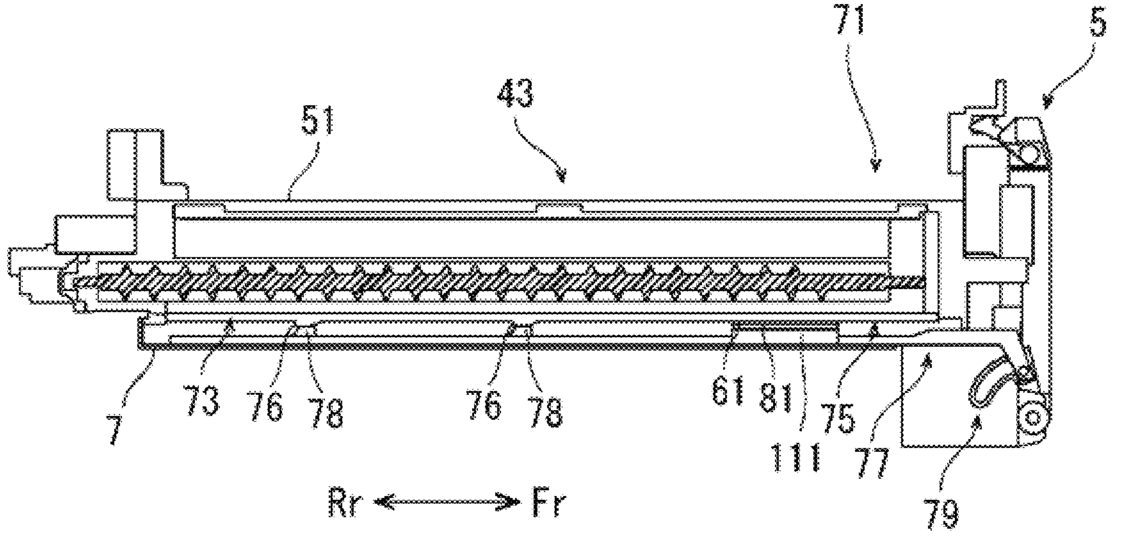
FIG. 6A is a side view showing a separation mechanism (in a state in which the lower rail has moved to a second position) in an image forming apparatus of an embodiment according to the present disclosure.
Figure 6B:
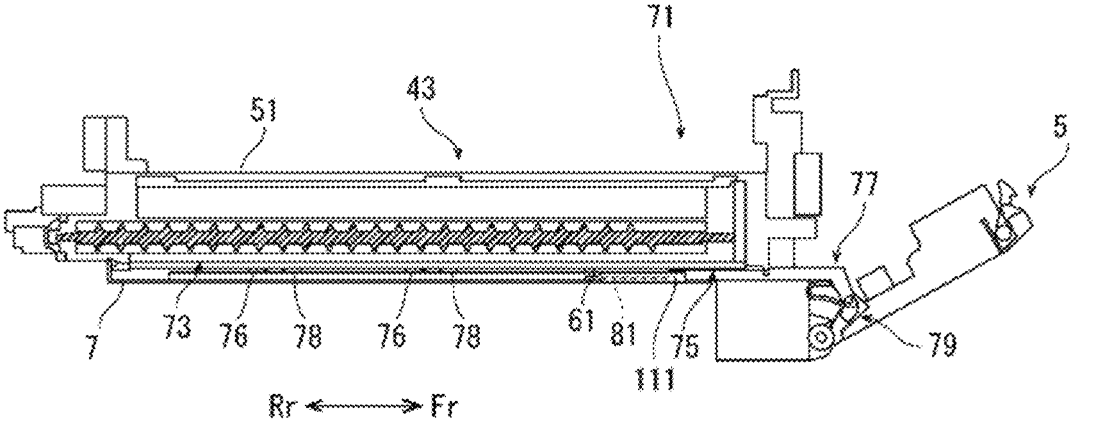
FIG. 6B is a side view showing a separation mechanism (in a state in which the lower rail has moved to a first position) in an image forming apparatus of an embodiment according to the present disclosure.
Figure 6C:
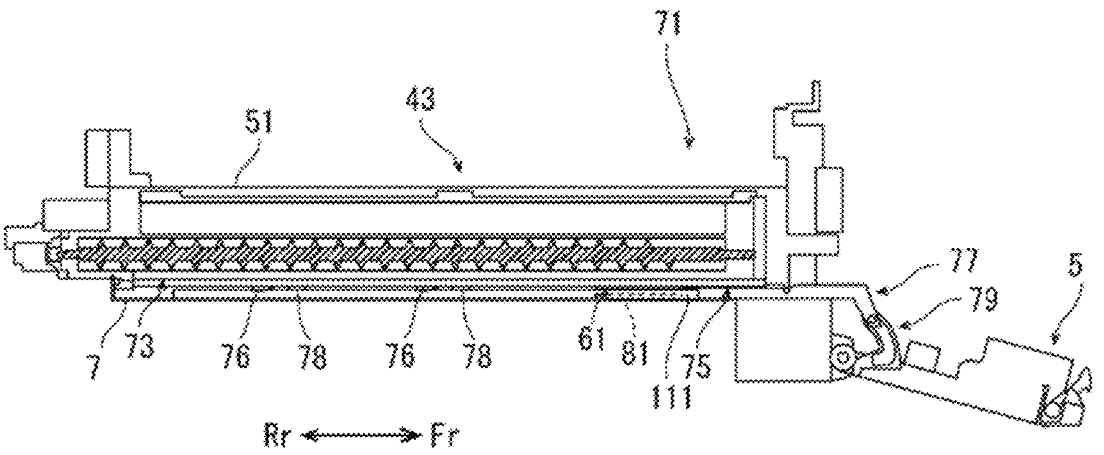
FIG. 6C is a side view showing a separation mechanism (in a state in which the lower rail has moved to the first position) in the image forming apparatus of an embodiment according to the present disclosure.

Next, an example of the separation mechanism 71 will be briefly described with reference to FIGS. 3A and 3B, as well as FIGS. 5 and 6A to 6C. FIG. 5 is a perspective view of a developing holder 73, an upper rail 75, and a lower rail 77 as viewed from below, and FIGS. 6A to 6C are side views showing the separating mechanism 71.

The separation mechanism 71 includes the developing holder 73, the upper rail 75 provided on the developing holder 73, the lower rail 77 provided on the developing device support portion of the support frame 7, and a link member 79.

As shown in FIG. 5, the developing holder 73 has a bottom wall portion 73*a* on which the developing device 43 is placed, and a rear wall portion 73*b* facing a rear end portion of the developing device 43. A drive gear 73*c* that is able to engage with a drive gear (not shown) of the developing roller 57 is supported by the rear wall portion 73*b*. The drive gear 73*c* is electrically connected to a motor (not shown).

Cylindrical portions 73*d* are provided at a right end portion of the bottom wall portion 73*a*, spaced apart in the front-rear direction. Each cylindrical portion 73*d* is externally fitted to a fulcrum shaft (not shown) provided on the developing device support portion of the support frame 7. Thus, the developing holder 73 is able to pivot in an up-down direction about the fulcrum shaft (cylindrical portion 73*d*) (see FIGS. 3A and 3B).

The upper rail 75 is fixed to a left end portion of a lower surface of the bottom wall portion 73*a* of the developing holder 73 along the front-rear direction. A plurality of (for example, two) upper protruding portions 76 are formed on the lower surface of the upper rail 75 at predetermined intervals in the front-rear direction.

Each upper protruding portion 76 has a substantially rectangular parallelepiped shape, and a surface on a front side thereof is inclined downward from the front side toward a rear side. Furthermore, a rectangular opening 75*a* is formed in the lower surface of the upper rail 75 farther toward the front than the two upper protruding portions 76.

The lower rail 77 is arranged at the left end portion of the developing device support portion so as to face the upper rail 75 of the developing holder 73, and is supported by the developing device support portion so as to be movable in the front-rear direction. A plurality of (for example, two) lower protruding portions 78 are formed on an upper surface of the lower rail 77 at predetermined intervals in the front-rear direction.

Each lower protruding portion 78 has a substantially rectangular parallelepiped shape, and a surface on a rear side thereof is inclined downward from the front side toward the rear side. Furthermore, on the upper surface of the lower rail 77, farther toward the front than the two lower protruding portions 78, a board holder support portion 111 that supports a relay board 81 connectable to the sensor 61 is provided. The relay board 81 and the board holder support portion 111 will be described later.

As shown in FIG. 6A and the like, the link member 79 connects the lower rail 77 and the inner cover 5. By rotating the inner cover 5 downward, the lower rail 77 moves forward via the link member 79.

When the inner cover 5 is rotated to the lowest position (see FIG. 6C), the lower rail 77 moves to a front-most position. This position is defined as the first position. When the inner cover 5 is rotated upward (see FIG. 6A), the lower rail 77 moves to a rear-most position via the link member 79. This position is defined as the second position.

As shown in FIG. 6A, in a state in which the inner cover 5 is completely closed, the lower rail 77 moves to the second position, the lower protruding portions 78 ride on the upper protruding portions 76 of the upper rail 75, and the developing device 43 is pivoted to the developing position shown in FIG. 3A.

As shown in FIG. 6B, when the inner cover 5 is opened to a predetermined position, the lower rail 77 moves to the first position, and the lower protruding portions 78 move toward the front from the upper protruding portions 76. As a result, the developing device 43 pivots about the fulcrum shaft (cylindrical portion 73*d*) to the separated position shown in FIG. 3B.

As shown in FIG. 6C, the lower rail 77 is maintained at the first position and the developing device 43 is maintained at the separated position until the inner cover 5 is completely opened.

By opening the inner cover 5 in this manner, the developing device 43 is exposed from the opening of the housing 3 and the developing roller 57 is separated from the photoconductor drum 45.

Therefore, by pulling out the developing device 43 toward the front after opening the inner cover 5, the developing device 43 can be removed without the developing roller 57 interfering with the photoconductor drum 45.

In addition, the upper rail 75 and the lower rail 77 support a relay board 81 for communication that can be electrically connected to the sensor 61 described above.

As described above, a value measured by the sensor 61 is transmitted to the control portion via the relay board 81. A structure in which the relay board 81 is supported by the upper rail 75 and the lower rail 77 will be described below.

Figure 7A:
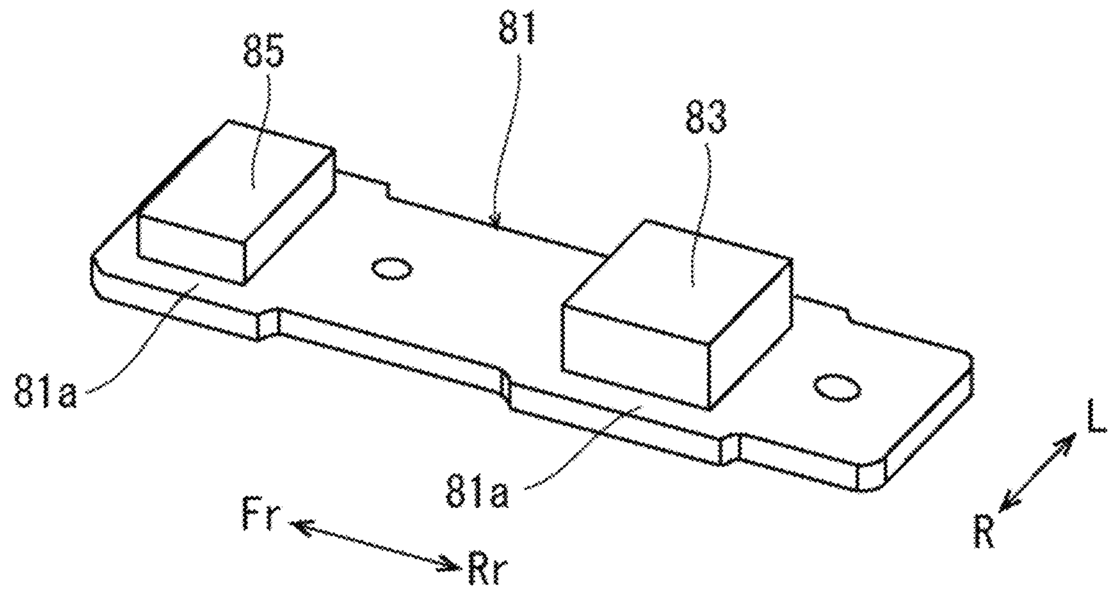
FIG. 7A is a perspective view showing a relay board in an image forming apparatus of an embodiment according to the present disclosure.

First, the relay board 81 will be explained with reference to FIGS. 7A to 7C. FIG. 7A is a perspective view showing the relay board 81, FIG. 7B is a perspective view showing a board holder 91, and FIG. 7C is a perspective view showing the relay board 81 supported by the board holder 91.

As shown in FIG. 7A, the relay board 81 has a rectangular shape, and large-area portions 81*a* that are long in a width direction are formed at one end portion (front end portion) in a longitudinal direction (front-rear direction) and at a central portion.

A rectangular parallelepiped contact portion 83 that can be electrically contacted with the sensor 61 is formed on an upper surface of the large area portion 81*a* on the central side. A rectangular parallelepiped-shaped protruding portion 85 is formed on an upper surface of the large-area portion 81*a* on the front end side.

Figure 7B:
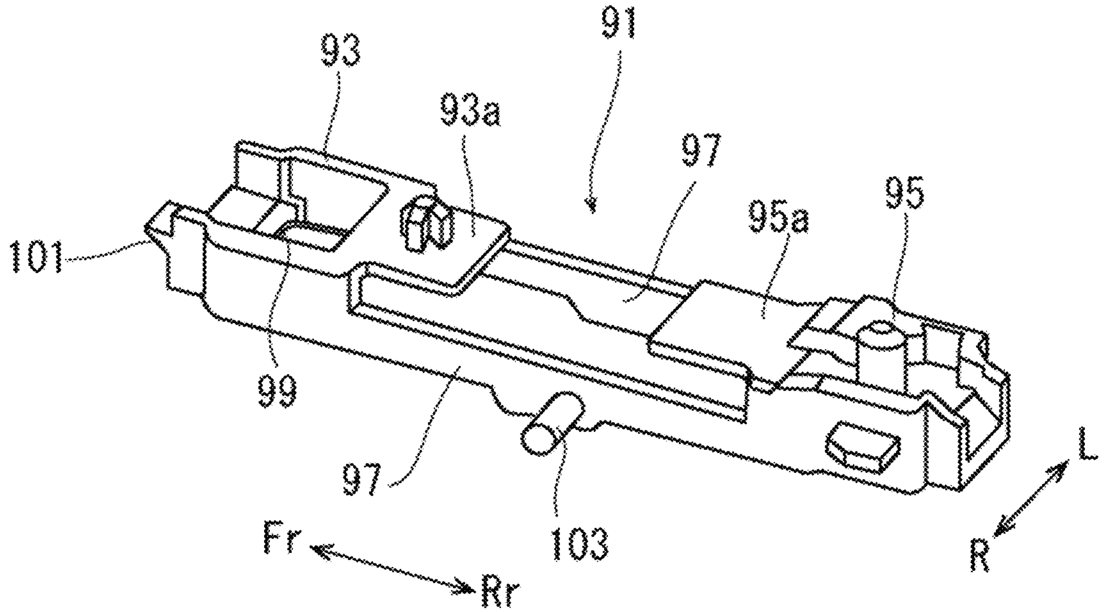
FIG. 7B is a perspective view showing a board holder in an image forming apparatus of an embodiment according to the present disclosure.
Figure 7C:
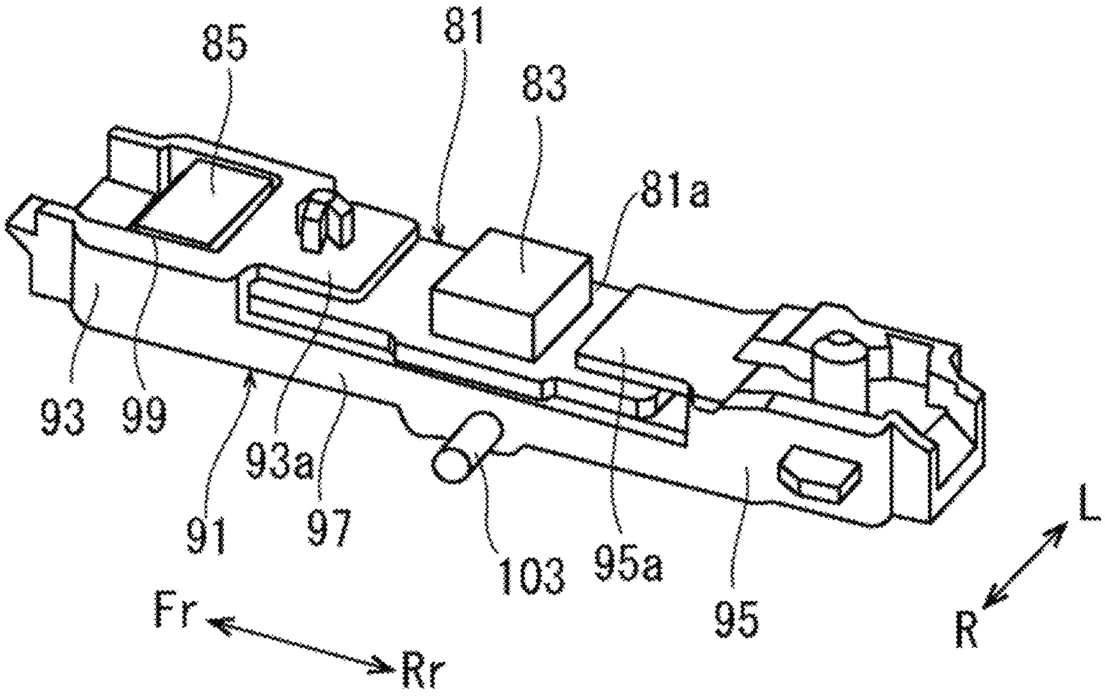
FIG. 7C is a perspective view showing a relay board supported by a board holder in an image forming apparatus of an embodiment according to the present disclosure.

As shown in FIG. 7B, the board holder 91 is a rectangular frame-like member, and has both end portions 93, 95 (front end portion 93 and rear end portion 95) in the longitudinal direction (front-rear direction), a pair of side plate portions

97 connecting both end portions 93, 95, and a hollow portion is formed between both end portions 93, 95 and the pair of side plate portions 97.

At both end portions 93, 95, front and rear holding pieces 93*a*, 95*a* extending in directions facing each other are formed so as to protrude into an opening between both end portions 93, 95. A predetermined space is open between the front and rear holding pieces 93*a*, 95*a*.

A rectangular opening 99 extending in the up-down direction is formed in the front end portion 93. A protruding portion 101 is formed on an end surface (front surface) of the front end portion 93. A lower surface of the protruding portion 101 is inclined downward from the front to the rear. Furthermore, a pair of bosses 103 that protrude in the width direction (left-right direction) are formed approximately at the central portion of the surfaces on outer sides of both side plate portions 97.

As shown in FIG. 7C, the relay board 81 is supported by the board holder 91 such that the large-area portion 81*a* on the central side is placed on the side plate portion 97 of the board holder 91 and is sandwiched between the front and rear holding pieces 93*a*, 95*a*.

The contact portion 83 of the relay board 81 protrudes upward from the space between the front and rear holding pieces 93*a*, 95*a*. The protruding portion 85 of the relay board 81 is fitted into the opening 99 of the front end portion 93 from below.

The board holder 91 supporting the relay board 81 in this way is fitted into the opening 75*a* (see FIG. 5) formed in the upper rail 75 so as to be movable in the up-down direction, and is also supported by the board holder support portion 111 (see FIG. 5) provided on the lower rail 77. As the lower rail 77 moves from the second position to the first position, the board holder 91 moves downward from the upper position in contact with the sensor 61 and from the sensor 61 to a lower position.

Figure 8A:
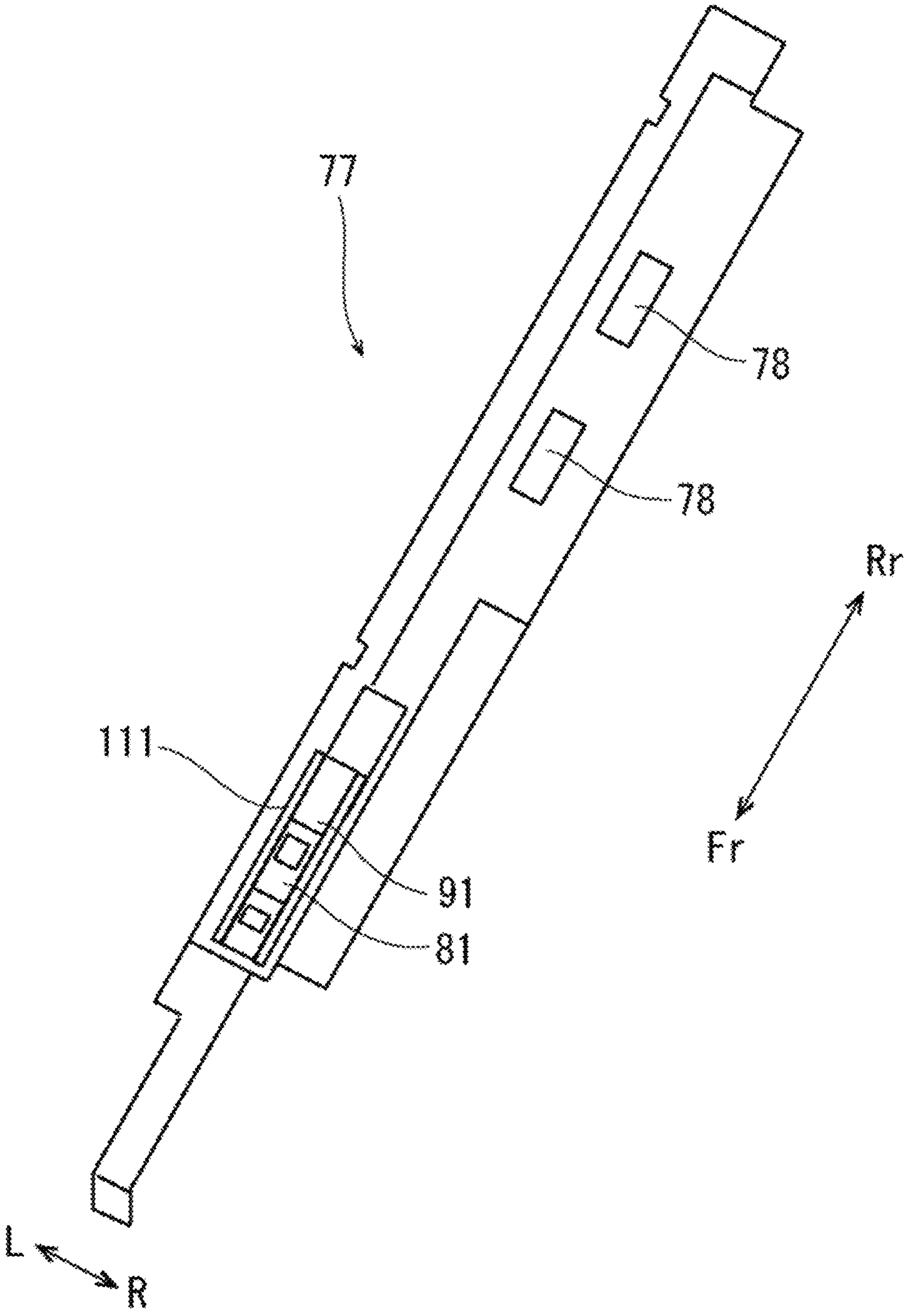
FIG. 8A is a perspective view of a lower rail viewed from above in an image forming apparatus of an embodiment according to the present disclosure.
Figure 8B:
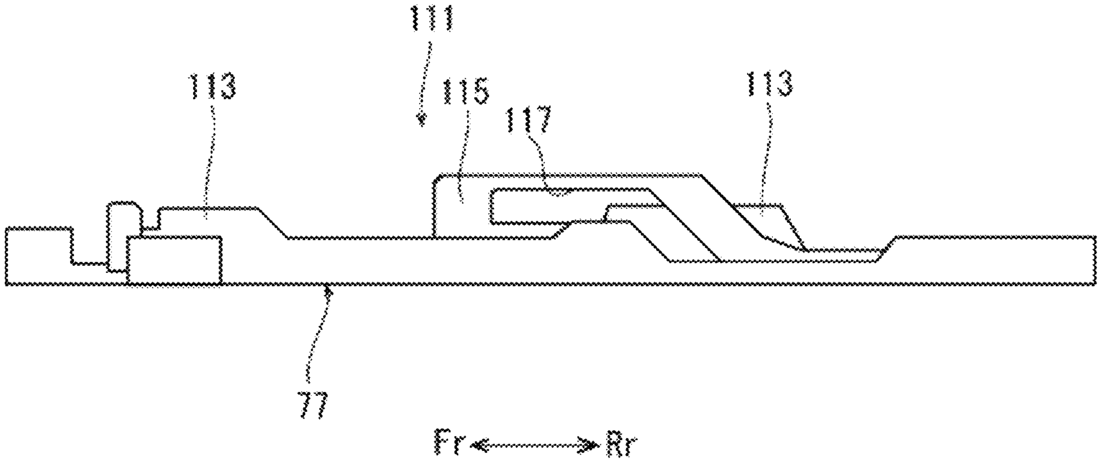
FIG. 8B is a side view showing a holder support portion of a lower rail in an image forming apparatus of an embodiment according to the present disclosure.
Figure 9A:
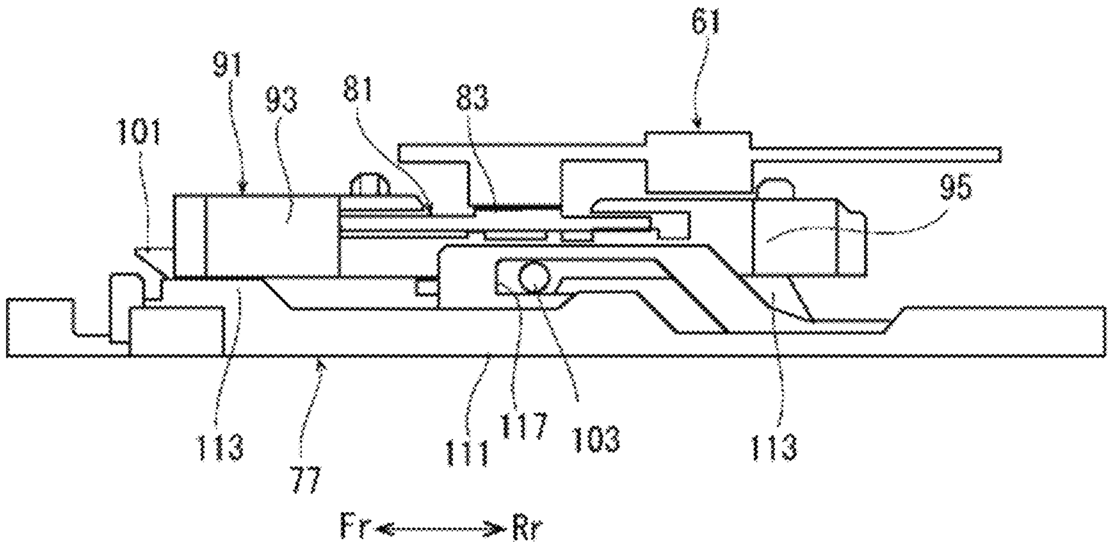
FIG. 9A is a side view showing a relay board moved to an upper position in an image forming apparatus of an embodiment according to the present disclosure.
Figure 9B:
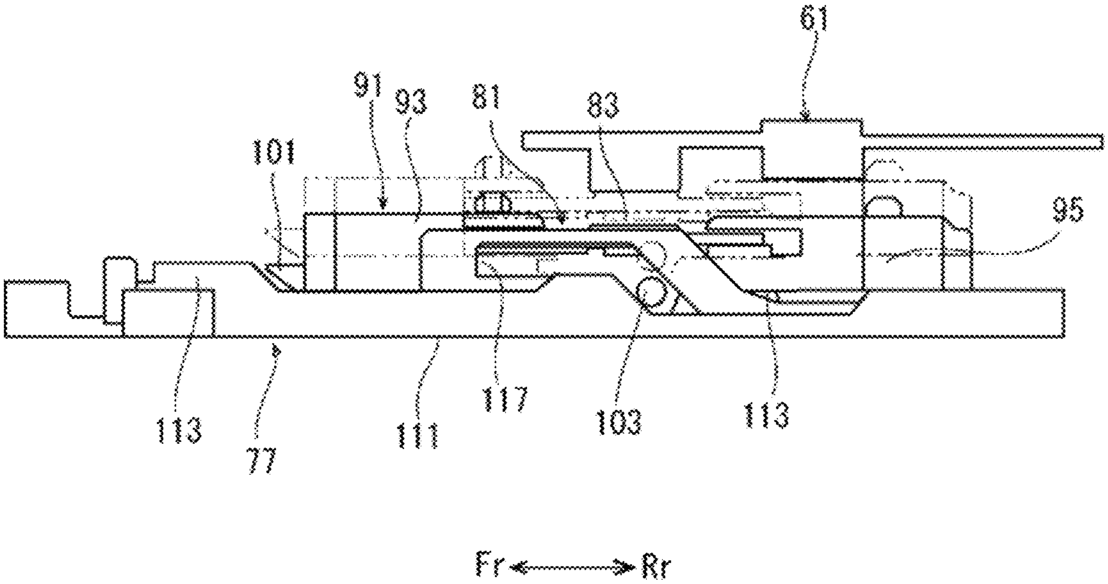
FIG. 9B is a side view showing a relay board moved to a lower position in an image forming apparatus of an embodiment according to the present disclosure.

Next, the board holder support portion 111 will be explained with reference to FIG. 5 and FIGS. 8A to 9B. FIG. 8A is a perspective view of the lower rail 77 as viewed from above, FIG. 8B is a side view showing the board holder support portion 111, FIG. 9A is a side view showing the relay board 81 moved to the upper position, and FIG. 9B is a side view showing the relay board 81 moved to the lower position.

As shown in FIG. 8A and FIG. 5, the board holder support portion 111 is provided farther toward the front than the two lower protruding portions 78. As shown in FIG. 8B, the board holder support portion 111 includes front and rear pedestal portions 113 separated in the front-rear direction, and left and right guide walls 115 separated in the left-right direction between the front and rear pedestal portions 113.

Each pedestal portion 113 has a flat rectangular parallelepiped shape. An upper surface of the pedestal portion 113 is formed flat, and a rear surface inclines downward from the front toward the rear. Guide grooves 117 are formed in the left and right guide walls 115.

Each guide groove 117 has a horizontal portion that is parallel to the upper surface of the pedestal portions 113, and an inclined portion that slopes downward toward the rear from the rear end of the horizontal portion. An angle of the inclined portion with respect to the horizontal plane is equal to an angle of the rear surface of the pedestal portion 113 with respect to the horizontal plane.

As described above, the board holder 91 is fitted into the opening 75*a* (see FIG. 5) of the upper rail 75 so as to be movable in the up-down direction, and is supported by the board holder support portion 111 of the lower rail 77.

More specifically, as shown in FIGS. 9A and 9B, the board holder 91 is arranged between the left and right guide walls 115, and the left and right bosses 103 are inserted into the left and right guide grooves 117.

Note that the relay board 81 is connected to the control portion provided in the housing 3 via a signal line and a power line. Lines such as these are connected to the control portion through, for example, an opening (not shown) formed in the lower rail 77.

In the image forming apparatus 1 having the above configuration, the behavior of the relay board 81 with respect to the sensor 61 when the developing device 43 is attached and removed will be explained with reference to FIGS. 9A, 9B, and the like.

In a state in which the lower rail 77 is moved to the second position by the separation mechanism 71 and the developing device 43 is pivoted to the developing position (see FIG. 3A), as shown in FIG. 9A, the front end portion 93 and the rear end portion 95 of the board holder 91 are placed on the upper surfaces of the pedestal portions 113 on the front and rear sides of the lower rail 77.

That is, the board holder 91 moves to the upper position, and the contact portion 83 of the relay board 81 comes in contact with the sensor 61. Thus, the sensor 61 and the relay board 81 are electrically connected, and the value measured by the sensor 61 is transmitted to the control portion via the relay board 81. In addition, the left and right bosses 103 of the board holder 91 are inserted into front end portions of the guide grooves 117 of the lower rail 77.

When maintaining or replacing the developing device 43, the inner cover 5 is opened as described above. Thus, the lower rail 77 moves forward from the second position to the first position, the developing device 43 pivots to the separated position, and the developing roller 57 separates from the photoconductor drum 45 (see FIG. 3B).

When the lower rail 77 moves in this way, as shown in FIG. 9B, the front and rear pedestal portions 113 are separated toward the front from the front end portion 93 and rear end portion 95 of the board holder 91, and the board holder 91 moves from the upper position to the lower position within the opening 75*a* of the upper rail 75 (see FIG. 5).

While the front end portion 93 and rear end portion 95 of the board holder 91 are moving along the upper surfaces of the front and rear pedestal portions 113 when the lower rail 77 is moving, the left and right bosses 103 move within the horizontal portions of the left and right guide grooves 117.

While the front end portion 93 and the rear end portion 95 are moving along the rear surfaces of the front and rear pedestal portions 113, the left and right bosses 103 move downward within the inclined portions of the left and right guide grooves 117. When the lower rail 77 moves to the first position in this manner, the board holder 91 moves to the lower position within the opening 75*a* of the upper rail 75. As a result, electrical contact between the relay board 81 and the sensor 61 is cut off.

After that, the developing device 43 can be removed from the developing holder 73 by pulling the developing device 43 toward the front with respect to the developing holder 73. At this time, the developing device 43 can be removed without the developing roller 57 interfering with the photoconductor drum 45 or the sensor 61 interfering with the relay board 81.

In addition, when the inner cover 5 is rotated upward after the developing device 43 is attached to the developing holder 73, the lower rail 77 moves toward the rear to the second position, and the developing device 43 pivots to the developing position (see FIG. 3A).

Furthermore, the lower surface and the rear end portion 95 of the protruding portion 101 of the board holder 91 are guided upward along the surface of the rear sides of the front and rear pedestal portions 113 of the lower rail 77, the left and right bosses 103 are guided along the left and right guide grooves 117, and the front end portion 93 and rear end portion 95 of the board holder 91 ride up on the upper surfaces of the front and rear pedestal portions 113.

Thus, the board holder 91 moves to the upper position through the opening 75*a* of the upper rail 75. As a result, the contact portion 83 of the relay board 81 comes into contact with the contact portion of the sensor 61, and the two are electrically connected.

As described above, according to the present disclosure, the relay board 81 (board holder 91) that relays between the sensor 61 and the control portion is arranged on the support frame 7 side, and thus processing of the signal line and the like between the relay board 81 and the control portion may be performed on the housing 3 side. Therefore, processing of the signal line of the density sensor 61 may be simplified. Accordingly, auto production of the developing device 43 becomes possible, and production efficiency may be increased.

Furthermore, the relay board 81 does not interfere with the sensor 61, the developing device 43, and the like when the developing device 43 is removed, and thus damage to the relay board 81, the sensor 61, and the like may be prevented. In addition, when the sensor 61 is simply moved together with the developing device 43 by the separation mechanism 71, there is a possibility that the sensor 61 and the relay board 81 may not be in stable contact with each other.

However, according to the present disclosure, the separation mechanism 71 moves the developing device 43 from the separated position to the developing position, and the relay board 81 moves from the lower position to the upper position and comes in contact with the sensor 61. Thus, the sensor 61 and the relay board 81 can be brought into contact with each other more reliably.

Moreover, the board holder 91 that supports the relay board 81 moves from the lower position to the upper position along the inclined surfaces of the pedestal portions 113 formed on the lower rail 77. Furthermore, the bosses 103 of the board holder 91 are guided along the guide grooves 117, and the board holder 91 moves between the upper position and the lower position. In this way, the board holder 91 may be moved stably.

The technique according to the present disclosure has been described with respect to particular embodiments; however, the technique according to the present disclosure is not limited to the embodiments described above. It is possible for those skilled in the art to modify the embodiments described above without departing from the scope and spirit of the present disclosure.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:

a photoconductor drum supported by a support frame, with an electrostatic latent image being formed on the photoconductor drum;

a developing device that is removably supported by the support frame and includes a developing roller configured to develop the electrostatic latent image formed on the photoconductor drum with a developing agent; and a developing housing configured to accommodate the developing agent;

a separation mechanism configured to move the developing device so that the developing roller is separated from the photoconductor drum before the developing device is removed from the support frame;

a sensor provided in the developing housing and configured to detect toner density within the developing housing; and a relay board supported by the support frame and configured to be electrically connectable to the sensor; wherein in a state in which the developing device is not being moved by the separation mechanism, the sensor is electrically connected to the relay board, and when the developing device is moved by the separation mechanism before the developing device is removed from the support frame, the sensor is separated from the relay board.

2. The image forming apparatus according to claim 1, wherein in a state in which the developing device is not being moved by the separation mechanism, the relay board is supported so as to be movable in an up-down direction between an upper position where the relay board is electrically connected to the sensor and a lower position where the electrical connection with the sensor is cut off; and when the developing device is moved by the separation mechanism so that the developing roller is separated from the photoconductor drum, the developing device moves from the upper position to the lower position.

3. The image forming apparatus according to claim 2, wherein the separation mechanism comprises:

a developing holder by which the developing device is supported;

an upper rail provided on a lower surface of the developing holder so as to extend in an axial direction of the developing roller, and having an upper protruding portion protruding downward; and a lower rail supported below the upper rail so as to be movable in the axial direction and having a lower protruding portion protruding upward; wherein when the lower rail moves to a first position where the lower protruding portion is separated from the upper protruding portion, the developing holder pivots so that the developing roller separates from the photoconductor drum;

when the lower rail moves to a second position where the lower protruding portion overlaps the upper protruding portion in the axial direction, the developing holder pivots so that the upper protruding portion rides up on the lower protruding portion and the developing roller comes in contact with the photoconductor drum; and the relay board moves from the upper position to the lower position as the lower rail moves from the second position to the first position.

4. The image forming apparatus according to claim 3, further comprising a board holder that is movably supported in an up-down direction by the upper rail and supports the relay board; wherein the lower rail has a pedestal portion on which the board holder is placed;

in a state in which the lower rail is moving to the second position, the board holder is placed on the pedestal portion and moves to the upper position; and when the lower rail moves to the first position, the board holder moves away from the pedestal portion and moves to the lower position.

5. The image forming apparatus according to claim 4, wherein the board holder has a boss that protrudes in a direction intersecting a direction of movement of the lower rail from the second position to the first position;

the lower rail has a guide groove into which the boss is inserted; and as the lower rail moves from the second position to the first position, the guide groove guides the board holder over the pedestal portion in a direction parallel to the direction of movement, and then downward toward an upstream side of the direction of movement.

6. The image forming apparatus according to claim 4, wherein the pedestal portion has an inclined surface that is inclined upward from the upstream side to a downstream side in the direction of movement; and when the lower rail moves from the first position to the second position, the board holder moves from the lower position to the upper position along the inclined surface.

* * * * *